United States Patent [19]

Klaasen

[11] 4,113,440

[45] Sep. 12, 1978

[54] APPARATUS FOR PRODUCING POLYMERS HAVING A WIDE MOLECULAR WEIGHT DISTRIBUTION

[75] Inventor: Dirk Klaasen, Geleen, Netherlands

[73] Assignee: Stamicarbon, B.V., Geleen, Netherlands

[21] Appl. No.: 709,080

[22] Filed: Jul. 27, 1976

[30] Foreign Application Priority Data

Aug. 5, 1975 [NL] Netherlands ................. 7509293

[51] Int. Cl.² ..................................... B01J 8/08
[52] U.S. Cl. ............................... 422/132; 526/65; 137/3; 137/561 R; 137/566; 137/571; 422/134
[58] Field of Search ............... 23/285, 288 E, 260, 23/263, 253 A; 260/95 R; 137/561 R, 563, 566, 567, 3, 571, DIG. 1; 526/64, 65

[56] References Cited

U.S. PATENT DOCUMENTS

| 2,769,804 | 11/1956 | Hanson | 260/95 R |
| 3,284,430 | 11/1966 | Forman et al. | 260/95 R |

Primary Examiner—James H. Tayman, Jr.
Attorney, Agent, or Firm—Cushman, Darby & Cushman

[57] ABSTRACT

A recycle system for polymerization of monomers to produce polymers of wide-molecular weight distribution comprising two reactors and two conduit lines disposed between said two reactors for forming a cyclic path, and means disposed in said lines for conveying the contents of one of said reactors to the other without affecting the polymerization conditions in each of said reactors which conditions may be different.

4 Claims, 1 Drawing Figure

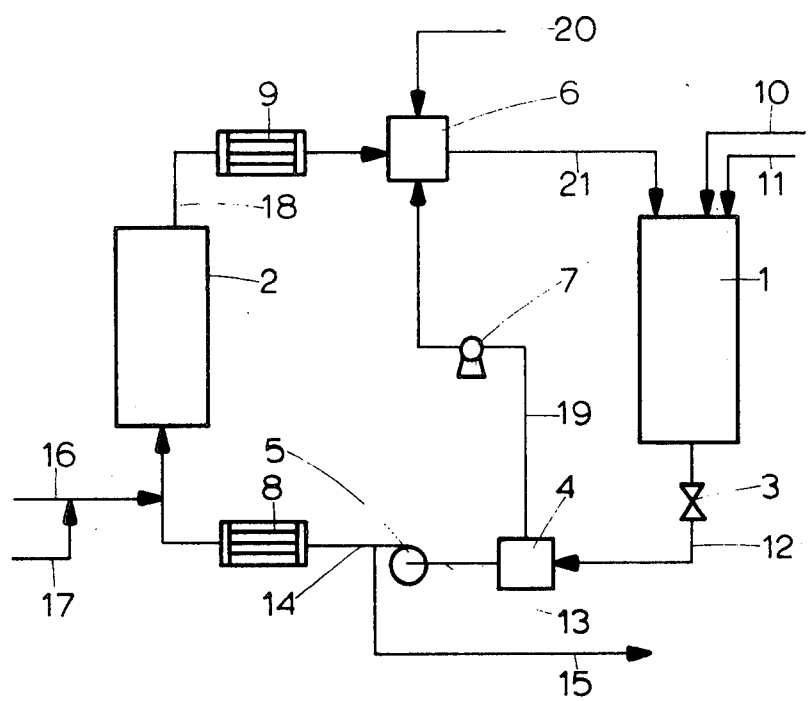

APPARATUS FOR PRODUCING POLYMERS HAVING A WIDE MOLECULAR WEIGHT DISTRIBUTION

The invention relates to an installation, for preparing polymers of wide molecular-weight distribution, which includes two polymerization reactors with a connection for discharging the contents from one reactor to the other, and provided with feed lines for components forming the polymerization medium, such as monomer or monomers, catalyst or catalyst components, optionally, a feed line for molecular-weight controllers, a discharge for polymer suspension, and cooling means for the removal of the polymerization heat.

Processes for polymerizing in two or more zones or reactors and suitable installations are disclosed in U.S. Pat. No. 3,074,922; German Auslegeschrift No. 1,138,940; French Patent Specification No. 1,236,365, and Netherlands Patent Application No. 64.13505. Polymerizations of this type are effected in at least two series-connected reactors and are used to obtain a polymer — polyolefins in said patent specifications — of wide molecular-weight distribution. In copending application Ser. No. 709,081, filed July 27, 1976 by the inventor and entitled "Polyalkenes of wide molecular weight distribution", a process is disclosed for overcoming undesirable characteristics, i.e. lack of homogeneity, of polymers produced in the series-connected reactors. A wide molecular-weight distribution is also a desirable characteristic in polymers other than polyolefins; and such a wide molecular-weight distribution can be realized by mixing polymers of low and high molecular weight or by polymerization in series-connected reactors under such conditions that polymers of different average molecular weights are formed in the different reactors.

SUMMARY OF THE INVENTION

It has now been found that an installation consisting of two polymerization reactors (a) and (b) with two conduits, one for the transport of the contents from reactor (a) to reactor (b) and with a second conduit line for directing contents of reactor (b) to reactor (a). As more specifically described below such an installation is useful in the preparation of polymers of wide molecular-weight distribution and very high homogeneity.

As mentioned above, the installation according to the invention naturally is provided with feeding elements, i.e., means for feeding in monomer, catalyst or catalyst components, distributing agent (solvent) and any other components that must be present in the polymerization medium, such as, e.g., molecular-weight controllers, suspension agents and/or other additives, a drain for discharging polymer suspension, and cooling members for removing the polymerization heat.

Installations for recycle polymerization systems are described in U.S. Pat. Nos. 3,257,362; 3,248,179, and 3,405,109; but the installations disclosed therein are loop reactors, in which polymerization is effected under the same conditions in the entire reactor.

In the polymerization installation according to the present invention, the polymerization in each of the reactors may be carried out under different conditions. This makes it possible to prepare polymers of different average molecular weights in the reactors, so that a homogeneous polymer with a wide molecular-weight distribution is ultimately obtained.

In the polymerization of $\alpha$-olefins in the presence of catalysts containing transition-metal compounds, for which the present installation is particularly suitable, the molecular weight can be controlled, i.e., by the choice of the temperature.

At relatively lower temperatures, polymers of high molecular weight are formed, and at higher temperatures, polymers of lower molecular weight are formed. Polymers with different molecular weights can now be prepared by effecting the polymerization in one reactor at a lower temperature than in the other.

The molecular weight can also be controlled by the addition of molecular-weight controllers among which hydrogen is the most conventional for use in polymerizations of $\alpha$-olefins. If polymer of different molecular weights is to be prepared in an installation according to the invention by means of a molecular-weight controller, two different monomer pressures may be employed in the two reactors, so that the ratio of monomer to molecular-weight regulator, which is determinative of the molecular weight, is different in these reactors. In this case the installation according to the invention must be provided with means for maintaining different pressures in the reactors: Suitable means are a relief valve in one of the connecting lines and a compressor in the other connecting line.

Preferably, however, polymers of wide molecular-weight distribution are prepared in the presence of different amounts of molecular-weight controller. This particular measure may be used in combination with other measures described above, the procedure being generally such that one of these measures augment the effects of the other. For instance, polymerization may be effected at a higher concentration of molecular-weight controller in one reactor than in the other. If the same polymerization is also effected at a lower pressure, the molar ratio of monomer to molecular-weight regulator can be further reduced and the action of the molecular weight regulator (controller) can be further enhanced, i.e., a polymer with a lower molecular weight can be prepared.

In order to undertake polymerization in the two reactors in the presence of different amounts, or rather different concentrations, of a molecular-weight controller, the present installation is equipped with particular means. In the polymerization of $\alpha$-olefins, hydrogen is the molecular-weight controller that is generally used. Gaseous or volatile molecular-weight controllers are also used in other types of polymerization. To allow the use of such gaseous or volatile molecular-weight controllers in different concentrations in the reactors, the installation according to the invention must be provided with a relief valve in one of the connecting lines and after it — as viewed in the recycling direction, i.e., in the direction of the pressure drop across the relief valve — a liquid-vapor separator whose liquid discharge is connected to the recycle system and whose vapor discharge is so connected to the other connecting line between the reactors that the vapor discharge of the liquid-vapor separator is fed back to the reactor before the relief valve. To this end, a compressor must be fitted between the vapor discharge and the feed-back to the reactor. The compressor will cause the discharged vapor to condense, at least to a considerable extent.

Feed-back into the recycle system is preferably effected by way of a mixing device in which the flow from the vapor discharge is incorporated in and mixed with the recycle flow. The flow from the vapor discharge, at least in part, is in the vapor phase, and, consequently, the mixing device is preferably an absorber, i.e., a device for the absorption of vapors or gases in a liquid. For, if hydrogen is used as the molecular-weight controller and a hydrocarbon or a hydrocarbon mixture as the distributing agent, it is difficult to incorporate the hydrogen again in the recycle flow. For this reason, the vapor discharge of the liquid-vapor separator is preferably connected to a compressor, so that the mixing or absorption is effected at a high pressure, especially at a pressure that is equal or almost equal to the pressure in the reactor to which the mixture is fed back. The hydrogen concentration desired in reactor 1 can then easily be reached in absorber 6 (see FIGURE) in the liquid phase.

The pressure in the liquid discharge of the vapor-liquid separator is lower, of course, than before the relief valve. In order to recycle the reaction mixture, another compressor must be provided in the recycle system. The compressor may be fitted before or after the reactor to which the liquid discharge from the liquid-vapor separator is passed. If the second compressor is installed after it, the pressure in this reactor will always be lower than in the other. If, alternatively, the compressor is placed before it, the pressure in the two reactors will be caused to be approximately equal. This latter embodiment is preferred since it offers greater possibilities of varying polymerization conditions in the two reactors and allows the conditions in the two reactors to be different. If the pressure in the reactor with the lower concentration of molecular-weight controller (reactor 2 in the Drawing) is lower than in the other reactor, the monomer pressure therein will also be lower. Under such conditions, increasing the ratio of monomer to molecular-weight controller would not be favored. This is another reason which favors the embodiment of placing the second compressor before this reactor rather than after it. The pressure in reactor 2 may even be higher than in the pressure reactor 1, but if such is the case a relief valve must be installed in the system after reactor 2.

The invention will be further elucidated with reference to the FIGURE annexed without being restricted by it.

The polymerization reactors may be of any conventional type, such as, e.g., reactors provided with stirrers, which, if so desired, may be multi-stage parallel or series-connected reactors or reactors divided into zones. The reactors may also be gas-stirred reactors in which the gas, which may consist completely or partly of gaseous monomer, is blown into the bottom of the reactor. The two reactors need not be of the same type or of the same size.

10 and 11 are feed lines for monomer in distributing agent and for catalyst. These feeds may be multiple, so that monomer, distributing agent and catalyst components can be fed in separately. The FIGURE is only meant as a diagram, the feed lines may communicate with the reactor in the top and/or at the bottom of the reactor or in any intermediate place; it is not necessary that all feed pipes enter the reactor at the same place. In this FIGURE the catalyst is fed into reactor 1, the reactor in which polymer of low-molecular weight can be prepared, as explained below; but the catalyst may also be fed into reactor 2 or both reactors, which would obviously necessitate the provision of additional necessary feed pipes. These statements also apply to feed lines for monomer and distributing agent and any other components of the polymerization mixture. Reactor 1 empties into relief valve 3 across which a pressure drop can be effected, and the reaction mixture discharged from reactor 1 through valve 3 can flow to liquid-vapor separator 4 through conduit 12. The polymerization conditions are generally such that, as a result of the pressure drop (across valve 3), part of the distributing agent and monomer change into the vapor phase; and all or a considerable amount of the molecular-weight controller gets into the vapor phase. The vapor phase is passed through conduit 19 to compressor 7, from where it flows to absorber 6.

The liquid phase is passed from the liquid-vapor separator to reactor 2 through conduit 13, compressor 5, and conduit 14. A cooler 8 is mounted in conduit 14. Cooling may be effected in any other suitable place and in any other suitable way, e.g. in the reactors by wall-cooling, by cooling devices in the reactors, by a cooler for the condensation of evaporated distributing agent. The FIGURE shows feed lines 16 and 17 for monomer and distributing agent. As mentioned above, monomer and/or distributing agent and/or catalyst or catalyst components may be fed to reactor 1 or reactor 2 or to both, so that the necessary provisions will have to be installed.

Conduit 18, which may be connected either to the top or the bottom, but preferably to the top, of reactor 2, serves to discharge the reaction mixture. A cooler 9 is fitted in conduit 18. The above-mentioned remarks on cooler 8 also apply to cooler 9. In absorber 6, the flow from conduit 19, which may be fully or partly liquid after compressor 7, may be mixed up in the flow of reaction mixture from conduit 18. Conduit 20 serves to add molecular-weight controller. Reaction mixture can be returned to reactor 1 through conduit 21. The reaction mixture consisting of distributing agent and polymer and other components, if any, can be removed from the installation through conduit 15, after which polymer can be recovered from it in a way known in itself. The remarks on the feed and discharge conduits of reactor 1 also apply to conduits 14, 16, 17, and 18, notably that each may end in the top or the bottom of the reactor or in any suitable place in between.

A number of parts are shown in the drawing which do not belong to the essence of the installation according to the invention, but cannot be left out for a proper understanding. The essence of the installation according to the invention consists in the reactors 1 and 2 arranged in a recycle system by means of the conduits 12, 13, and 14 and also 18 and 21. The means for by-passing the molecular-weight regulator around reactor 2, viz. relief valve 3, vapor-liquid separator 4, compressors 5 and 7, and mixing device 6, which may be an absorber, comprise a preferred embodiment of the installation according to the invention.

Discharge 15 may be connected to any point of the recycle system, both to the reactors and the connecting lines: the connection after compressor 5 shown in the FIGURE is only meant as an example. A very suitable point for connection of 15 is conduit 13. The fraction to be discharged will not be compressed then, which saves compressive energy. On the other hand, some homogenization is generally effected in a compressor, so that discharge after compressor 5 may also be advantageous. However, this advantage depends on the polymerization conditions and is not per se essential to the present installation.

In the embodiment shown diagrammatically in the FIGURE, the pressure in the reactors 1 and 2 will be equal, at least approximately.

To enable polymerization at different pressures, compressor 5 may also be placed after reactor 2, even in conduit 21 so that compressor 7 might then be omitted. However, the pressure in reactor 2 cannot be controlled independently of the pressure decrease applied for the desired lowering of the concentration of the molecular-weight controller. Independent control is possible if another compressor is fitted in conduit 18, so that a stepwise increase in pressure is effected across compressor 5 and this compressor.

The possibilities of preparing polymers of different molecular weights by carrying out the polymerization in reactors 1 and 2 with different concentrations of molecular-weight controller and at different temperatures are usually sufficient so that polymerization at different pressures need not be considered. For that matter, in polymerization at different pressures, the pressure in reactor 2 must be higher than that in reactor 1 in order to enhance the effect of the molecular-weight regulator. Compressor 5 would then have to cause a rise in the pressure to over the pressure in reactor 1, and means for pressure release, e.g. a relief valve, would have to be fitted in conduit 18. In most cases, this is not done, so that only different concentrations of molecular-weight controller and different temperatures are possible, but, as mentioned above, these possibilities are usually sufficient.

What is claimed is:

1. An installation for preparing polymers of wide molecular weight distribution comprising two reactors A and B, each of said reactors being provided with an inlet means and an outlet means;

a first conduit means connecting said inlet means of reactor A with the outlet means of reactor B; and a second conduit means connecting said inlet means of reactor B with outlet means of reactor A, thereby forming a circuit for cycling at least part of the contents of reactor A to reactor B and then back to reactor A, through said first and said second conduit means;

a third conduit means communicating with said circuit, for feeding reactants and solvents into said circuit;

a discharge means, communicating with said circuit, for discharging at least a part of the contents of said circuit;

said circuit equipped with means for causing a flow of the contents of that circuit;

wherein said means for causing flow comprises a relief valve and a compressor, said relief valve being disposed in said first conduit means and communicating with the interior of said first conduit means and said compressor being in communication with said second conduit means, wherein said relief valve and said compressor allow polymerization in reactor A to occur at a different pressure from the pressure of polymerization in reactor B;

through reactor A, said second conduit means, reactor B, said first conduit means and reactor A, respectively, and said circuit being equipped with cooling means to remove heat of polymerization generated during the operation of said installation;

a vapor separator being in communication with said first conduit means, in a position between said relief valve and said inlet of reactor A;

a fourth conduit means disposed between, connecting and in communication with said first and second conduit means, and in communication with said vapor separator;

an absorber disposed in and in communication with said second conduit means, said absorber being between the inlet of reactor B and said compressor; and a fifth conduit means being in communication with said circuit in a position after said outlet means of reactor A.

2. The installation of claim 1, wherein said separator is equipped with liquid discharge means and vapor discharge means, wherein each of said liquid discharge means and vapor discharge means is connected with a compressor.

3. The installation of claim 2, which further includes a mixing device for the recycle flow and the flow from the vapor discharge of the said separator.

4. The installation of claim 3, which further includes an absorber for the absorption in, or mixing with, the recycle flow of both gaseous and liquid components in the flow from the vapor discharge of the said separator.

* * * * *